(12) United States Patent
Rhodes et al.

(10) Patent No.: US 7,698,225 B2
(45) Date of Patent: Apr. 13, 2010

(54) LICENSE MODES IN CALL PROCESSING

(75) Inventors: James E. Rhodes, Boulder, CO (US);
Robert J. Serkowski, Broomfield, CO (US); William T. Walker, Evergreen, CO (US); Lawrence John Morgan, Broomfield, CO (US); Mohana Krishnan Gopalakrishna, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 885 days.

(21) Appl. No.: 10/232,508

(22) Filed: Aug. 30, 2002

(65) Prior Publication Data
US 2004/0044629 A1 Mar. 4, 2004

(51) Int. Cl.
*G06F 17/40* (2006.01)
(52) U.S. Cl. .................. 705/59; 380/231; 726/27
(58) Field of Classification Search ........... 705/1; 380/231; 370/372; 717/177
See application file for complete search history.

(56) References Cited

U.S. PATENT DOCUMENTS

| | | | |
|---|---|---|---|
| 4,288,659 A | 9/1981 | Atalla | 178/22.08 |
| 4,405,829 A | 9/1983 | Rivest et al. | |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A | 6/1990 | Robert et al. | |
| 5,157,663 A | 10/1992 | Major et al. | |
| 5,179,591 A | 1/1993 | Hardy et al. | 380/21 |
| 5,204,897 A | 4/1993 | Wyman | 380/4 |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | |
| 5,329,570 A | 7/1994 | Glassmacher et al. | 379/189 |
| 5,341,427 A | 8/1994 | Hardy et al. | 380/21 |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |

(Continued)

FOREIGN PATENT DOCUMENTS

EP 1 071 253 A1 1/2001

OTHER PUBLICATIONS

U.S. Appl. No. 09/357,679, filed Jul. 20, 1999, Serkowski.

(Continued)

*Primary Examiner*—Evens J Augustin
(74) *Attorney, Agent, or Firm*—Sheridan Ross P.C.

(57) ABSTRACT

The present invention is directed to a system, comprising: a license manager 113 operable to identify the occurrence of a predetermined licensing event and a mode setting agent 124 operable to change, in response to the occurrence of the predetermined licensing event (e.g., an absence of a valid license), from a first licensing mode (e.g., a license normal mode) to a second licensing mode (e.g., a license error mode). The second licensing mode is different from the first licensing mode. In each of the first and second licensing modes a common set of features performed by the telecommunication application (e.g., call processing functions) are operational.

42 Claims, 5 Drawing Sheets

U.S. PATENT DOCUMENTS

| | | | |
|---|---|---|---|
| 5,671,412 A | 9/1997 | Christiano | |
| 5,673,315 A | 9/1997 | Wolf | |
| 5,699,431 A | 12/1997 | Van Oorschot et al. | 380/30 |
| 5,708,709 A * | 1/1998 | Rose | 705/59 |
| 5,717,604 A | 2/1998 | Wiggins | 709/229 |
| 5,724,428 A | 3/1998 | Rivest | |
| 5,742,757 A | 4/1998 | Hamadani et al. | |
| 5,745,569 A | 4/1998 | Moskowitz et al. | |
| 5,745,576 A | 4/1998 | Abraham et al. | 380/25 |
| 5,745,879 A * | 4/1998 | Wyman | 705/1 |
| 5,758,068 A * | 5/1998 | Brandt et al. | 726/27 |
| 5,758,069 A | 5/1998 | Olsen | |
| 5,790,074 A | 8/1998 | Rangedahl et al. | 342/357.13 |
| 5,790,664 A | 8/1998 | Coley et al. | 380/4 |
| 5,828,747 A | 10/1998 | Fisher et al. | |
| 5,835,600 A | 11/1998 | Rivest | |
| 5,864,620 A | 1/1999 | Pettitt | |
| 5,905,793 A | 5/1999 | Flockhart et al. | |
| 5,905,860 A | 5/1999 | Olsen et al. | 395/187.01 |
| 5,940,504 A * | 8/1999 | Griswold | 705/59 |
| 5,960,085 A | 9/1999 | de la Huerga | |
| 5,978,565 A | 11/1999 | Ohran et al. | |
| 5,982,873 A | 11/1999 | Flockhart et al. | |
| 5,995,625 A | 11/1999 | Sudia et al. | |
| 6,009,401 A | 12/1999 | Horstmann | |
| 6,011,973 A | 1/2000 | Valentine et al. | 455/456.6 |
| 6,023,763 A | 2/2000 | Grumstrup et al. | |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | 709/226 |
| 6,128,389 A | 10/2000 | Chan et al. | |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 * | 2/2001 | Misra et al. | 717/177 |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,360,320 B1 | 3/2002 | Ishiguro et al. | |
| 6,463,534 B1 | 10/2002 | Geiger et al. | |
| 6,502,079 B1 * | 12/2002 | Ball et al. | 705/59 |
| 6,513,117 B2 | 1/2003 | Tarpenning et al. | |
| 6,557,105 B1 | 4/2003 | Tardo et al. | |
| 6,574,612 B1 | 6/2003 | Baratti et al. | |
| 6,584,454 B1 | 6/2003 | Hummel et al. | |
| 6,640,305 B2 | 10/2003 | Kocher et al. | |
| 6,675,208 B1 | 1/2004 | Rai et al. | |
| 6,697,945 B2 | 2/2004 | Ishiguro et al. | |
| 6,760,324 B1 | 7/2004 | Scott et al. | |
| 6,765,492 B2 | 7/2004 | Harris | 340/686.6 |
| 6,769,063 B1 | 7/2004 | Kanda et al. | |
| 6,775,782 B1 | 8/2004 | Buros et al. | |
| 6,778,820 B2 | 8/2004 | Tendler | 455/414.2 |
| 6,816,842 B1 | 11/2004 | Singh et al. | |
| 6,826,606 B2 * | 11/2004 | Freeman et al. | 709/223 |
| 6,850,958 B2 | 2/2005 | Wakabayashi | |
| 6,854,010 B1 | 2/2005 | Christian et al. | |
| 6,868,403 B1 | 3/2005 | Wiser et al. | |
| 6,876,984 B2 | 4/2005 | Tadayon et al. | |
| 6,883,095 B2 | 4/2005 | Sandhu et al. | |
| 6,889,212 B1 | 5/2005 | Wang et al. | |
| 6,904,523 B2 | 6/2005 | Bialick et al. | |
| 6,920,567 B1 * | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,957,344 B1 | 10/2005 | Goldshlag et al. | |
| 6,961,858 B2 | 11/2005 | Fransdonk | |
| 6,973,444 B1 | 12/2005 | Blinn et al. | |
| 6,976,164 B1 | 12/2005 | King et al. | |
| 6,981,222 B2 | 12/2005 | Rush et al. | |
| 7,032,113 B2 | 4/2006 | Pendlebury | |
| 7,065,214 B2 | 6/2006 | Ishiguro et al. | |
| 7,073,063 B2 | 7/2006 | Peinado | |
| 7,085,382 B2 | 8/2006 | Terao et al. | |
| 7,100,044 B2 | 8/2006 | Watanabe et al. | |
| 7,124,304 B2 | 10/2006 | Bel et al. | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,206,936 B2 | 4/2007 | Aull et al. | |
| 7,225,333 B2 | 5/2007 | Peinado et al. | |
| 7,228,426 B2 | 6/2007 | Sinha et al. | |
| 7,302,703 B2 | 11/2007 | Burns | |
| 7,308,717 B2 | 12/2007 | Koved et al. | |
| 7,313,828 B2 | 12/2007 | Holopainen | |
| 7,318,236 B2 | 1/2008 | DeMello et al. | |
| 7,356,692 B2 | 4/2008 | Bialick et al. | |
| 7,382,881 B2 | 6/2008 | Uusitalo et al. | |
| 7,383,205 B1 | 6/2008 | Peinado et al. | |
| 7,545,931 B2 | 6/2009 | Dillaway | |
| 2001/0001268 A1 | 5/2001 | Menon et al. | |
| 2001/0013024 A1 | 8/2001 | Takahashi | |
| 2001/0034846 A1 | 10/2001 | Beery | |
| 2002/0001302 A1 * | 1/2002 | Pickett | 370/352 |
| 2002/0013722 A1 | 1/2002 | Kanaga | |
| 2002/0017977 A1 | 2/2002 | Wall | 340/5.28 |
| 2002/0038422 A1 | 3/2002 | Suwamoto et al. | |
| 2002/0052939 A1 | 5/2002 | Lee | |
| 2002/0083003 A1 * | 6/2002 | Halliday et al. | 705/52 |
| 2002/0087892 A1 | 7/2002 | Imazu | |
| 2002/0104006 A1 | 8/2002 | Boate et al. | |
| 2002/0107809 A1 | 8/2002 | Biddle et al. | |
| 2002/0112186 A1 | 8/2002 | Ford et al. | |
| 2002/0116340 A1 | 8/2002 | Hellberg et al. | |
| 2002/0125886 A1 | 9/2002 | Bates et al. | 324/307 |
| 2002/0138441 A1 | 9/2002 | Lopatic | |
| 2002/0154777 A1 | 10/2002 | Candelore | 380/258 |
| 2002/0164025 A1 * | 11/2002 | Raiz et al. | 380/231 |
| 2002/0174356 A1 * | 11/2002 | Padole et al. | 713/200 |
| 2002/0176404 A1 * | 11/2002 | Girard | 370/352 |
| 2002/0188656 A1 | 12/2002 | Patton et al. | |
| 2002/0188704 A1 | 12/2002 | Gold et al. | |
| 2002/0194473 A1 | 12/2002 | Pope et al. | |
| 2003/0005427 A1 * | 1/2003 | Herrero | 717/178 |
| 2003/0013411 A1 | 1/2003 | Uchiyama | |
| 2003/0023564 A1 | 1/2003 | Padhye et al. | |
| 2003/0055749 A1 | 3/2003 | Carmody et al. | |
| 2003/0095542 A1 | 5/2003 | Chang et al. | |
| 2003/0144959 A1 | 7/2003 | Makita | |
| 2003/0149670 A1 | 8/2003 | Cronce | |
| 2003/0149874 A1 | 8/2003 | Balfanz et al. | |
| 2003/0156719 A1 | 8/2003 | Cronce | |
| 2003/0163428 A1 | 8/2003 | Schneck et al. | |
| 2003/0191936 A1 | 10/2003 | Kawatsura et al. | |
| 2003/0208449 A1 | 11/2003 | Diao | |
| 2003/0233547 A1 | 12/2003 | Gaston et al. | |
| 2004/0073517 A1 | 4/2004 | Zunke et al. | 705/59 |
| 2004/0078339 A1 | 4/2004 | Goringe et al. | 705/59 |
| 2004/0088541 A1 | 5/2004 | Messerges et al. | |
| 2004/0103011 A1 | 5/2004 | Hatano et al. | |
| 2004/0103324 A1 | 5/2004 | Band | |
| 2004/0127196 A1 | 7/2004 | Dabbish et al. | |
| 2004/0128395 A1 | 7/2004 | Miyazaki | |
| 2004/0128551 A1 | 7/2004 | Walker et al. | 713/201 |

| | | | |
|---|---|---|---|
| 2004/0133794 | A1 | 7/2004 | Kocher et al. |
| 2004/0162998 | A1 | 8/2004 | Tuomi et al. |
| 2004/0166878 | A1 | 8/2004 | Erskine et al. ............ 455/456.1 |
| 2004/0172367 | A1 | 9/2004 | Chavez ......................... 705/59 |
| 2004/0181695 | A1 | 9/2004 | Walker ........................ 713/202 |
| 2004/0181696 | A1 | 9/2004 | Walker ........................ 713/202 |
| 2004/0199760 | A1 | 10/2004 | Mazza ......................... 713/150 |
| 2004/0249763 | A1 | 12/2004 | Vardi |
| 2004/0260589 | A1 | 12/2004 | Varadarajan et al. |
| 2004/0268120 | A1 | 12/2004 | Mirtal et al. |
| 2005/0005098 | A1 | 1/2005 | Michaelis et al. |
| 2005/0038753 | A1 | 2/2005 | Yen et al. |
| 2005/0076204 | A1 | 4/2005 | Thornton et al. |
| 2005/0086174 | A1 | 4/2005 | Eng |
| 2005/0144437 | A1 | 6/2005 | Ransom et al. |
| 2005/0154877 | A1 | 7/2005 | Trench |
| 2005/0185792 | A1 | 8/2005 | Tokutani et al. |
| 2005/0198510 | A1 | 9/2005 | Robert et al. |
| 2005/0202830 | A1 | 9/2005 | Sudit ........................ 455/456.1 |
| 2005/0229004 | A1 | 10/2005 | Callaghan |
| 2005/0246098 | A1 | 11/2005 | Bergstrom et al. ........... 701/213 |
| 2005/0289072 | A1 | 12/2005 | Sabharwal |
| 2006/0036554 | A1 | 2/2006 | Schrock et al. |
| 2006/0036894 | A1 | 2/2006 | Bauer et al. |
| 2006/0089912 | A1 | 4/2006 | Spagna et al. |
| 2006/0178953 | A1 | 8/2006 | Aggarwal et al. |
| 2007/0033419 | A1 | 2/2007 | Kocher et al. |
| 2007/0107067 | A1 | 5/2007 | Fountian |
| 2008/0082449 | A1 | 4/2008 | Wilkinson et al. |
| 2008/0141242 | A1 | 6/2008 | Shapiro |

OTHER PUBLICATIONS

U.S. Appl. No. 10/231,957, filed Aug. 30, 2002, Serkowski et al.
U.S. Appl. No. 10/232,507, filed Aug. 30, 2002, Serkowski et al.
U.S. Appl. No. 10/231,999, filed Aug. 30, 2002, Walker et al.
U.S. Appl. No. 10/232,906, filed Aug. 30, 2002, Walker et al.
U.S. Appl. No. 10/232,647, filed Aug. 30, 2002, Walker et al.
U.S. Appl. No. 10/811,412, filed Mar. 25, 2004, Walker.
U.S. Appl. No. 10/947,418, filed Sep. 21, 2004, Gilman et al.
U.S. Appl. No. 10/775,498, filed Feb. 9, 2004, Gilman et al.
ADTech Engineering, "IP Phone SI-160 User Manual (SCCP releases)," Version 1.2 (2002), pp. 1-20.
Articsoft Limited, "Public Key Infrastructure (PKI) FAQs" (Feb. 2, 2003), available at http://www.articsoft.com/wp_pki_faq.htm, 5 pages.
ARSYS, "Public Key Infrastructure," (Feb. 4, 2001), available at http://www.transactiontrust.com/technicaindex.html, 4 pages.
Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.
Datakey, "Securing a Virtual Private Network with Smart Card Technology" available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible," vol. 1, Iss. 1 (Jan. 2000), available at http://www.discerningtoday.org/members/Digest/2000Digest/January/Global%20Control.htm, 2 pages.
Info Merchant Store, "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.
Griswold, Robert S., "Get Smart: The Coming Revolution of Smart Cards," *Journal of Property Management* (May/Jun. 1997), 5 pages.
Entrust Inc., "Entrust Authority Security Manager," (printed Aug. 13, 2004), available at http://www.entrust.com/authority/manager/index.htm, 23 pages.
Infosec Engineering, "Building a Corporate Public Key Infrastructure" (1999), available at http://www.infoseceng.com/corppkl.htm, 20 pages.
LockStream Corporation, "Catalyst DRM Service Platform Architecture," Vers. 1.0 (Nov. 2003), pp. 1-28.

LockStream Corporation, "Catalyst DRM Service Platform" (printed Aug. 13, 2004), available at http://www.lockstream.com/products_spcm.php, 1 page.
LockStream Corporation, "Lockstream KeyDRM" (printed Aug. 13, 2004), available at http://www.lockstream.com/products_1gm.php, 2 pages.
LockStream Corporation, "Lockstream OMA 1.0 DRM Client" (printed Aug. 13, 2004); available at http://www.lockstream.com/products_sprm.php, 2 pages.
Microsoft Corporation, "Accessing a Smart Card" (Aug. 2002), available at http://msdn.microsoft.com/library/en-us/security/security/accessing_a_smart_card.asp, p. 1.
Microsoft Corporation, "Base Service Providers" (Aug. 2002), available at http://msdn.microsoft.com/library/en-us/security/security/base_service_providers.asp, p. 1.
Microsoft Corporation, "Building an ISO7816-4 APDU Command" (Aug. 2002), available at http://msdn.microsoft.com/library/en-us/security/security/building_an_iso7816_4_apdu_command.asp, pp. 1-2.
Microsoft Corporation, "Introducing Smart Cards to the System" (Aug. 2002), available at http://msdn.microsoft.com/library/en-us/security/security/introducing_smart_cards_to_the_system.asp, p. 1.
Microsoft Corporation, "Primary Service Provider" (Aug. 2002), available at http://msdn.microsoft.com/library/en-us/security/security/primary_service_provider.asp, p. 1.
Microsoft Corporation, "Smart Card Authentication" (Aug. 2002), available at http://msdn.microsoft.com/library/en-us/security/security/smart_card_authentication.asp, pp. 1-2.
Microsoft Corporation, "Smart Card Interfaces" (Aug. 2002), available at http://msdn.microsoft.com/library/en-us/security/security/smart_card_interfaces.asp, p. 1.
Microsoft Corporation, "Smart Card Resource Manager" (Aug. 2002), available at http://msdn.microsoft.com/library/en-us/security/security/smart_card_resource_manager.asp, p. 1.
Microsoft Corporation, "Smart Card User Interface" (Aug. 2002), available at http://msdn.microsoft.com/library/en-us/security/security/smart_card_user_interface.asp, p. 1.
Microsoft Corporation, "Smart Card Service Providers" (Aug. 2002), available at http://msdn.microsoft.com/library/en-us/security/security/smart_card_service_providers.asp, p. 1.
Microsoft Corporation, "Vendor Wrapper Service Provider" (Aug. 2002), available at http://msdn.microsoft.com/library/en-us/security/security/vendor_wrapper_service_provider.asp, pp. 1-2.
MIT Laboratory for Computer Science, "The Cricket Indoor Location System," An NMS Project (printed Jul. 31, 2002), available at http://nms.lcs.mit.edu/projects/cricket/, 5 pages.
Motorola Press Release, "ERG Motorola Alliance Receives Award for Smart Card" (Jun. 6, 2000), available at http://www.motorola.com/LMPS/pressreleases/page888.htm, 3 pages.
NEC Infrontia Corporation Press Release, "Establishment of "SmartCardInfrontia" solutions for 'IC card'," (Mar. 13, 2002), 4 pages.
Novell®, "Certificate Server: Public Key Instrastructure," White Paper (1999), pp. 1-10.
SecurityConfig, Back Up Your Encrypting File System Private Key in Windows 2000 Download (Printed Aug. 13, 2004), available at http://www.securityconfig.com/software/alerts/back_up_your_encrypting_file_system_private_key_in_windows_2000.html, 2 pages.
Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.
Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.

SSH Communications Security Corp., "Enabling Virtual Public Networks with Public Key Infrastructure," White Paper (Jan. 2004), pp. 1-9.

Streetman, Kibbee D. et al., "Public Key Infrastructure: Resources, Requirements and Recommendations," ATI IPT Special Report 00-06 (Apr. 2000), pp. 1-45.

Sun Developer Network, "Smart Card Overview," Sun Microsystems, Inc. (1994-2004), available at http://java.sun.com/products/javacard/smartcards.html, 2 pages.

NetLingo Dictionary of Internet Words, "Smart Card" (1995-0004), available at http://www.netlingo.com/lookup.cfm?term=smart+card, 2 pages.

Rankl, Wolfgang, "Smart Card Handbook," (Jun. 13, 2004), available at http://www.wrankl.de/SCH/SCH.html, 8 pages.

Russinovich, Mark, "Inside Encrypting File System, Part 1," *Windows & .NET Magazine* (Jun. 1999), available at http://www.winntmag.com/Articles/Index.cfm?ArticleID=5387&Key=Internals, 4 pages.

Russinovich, Mark, "Inside Encrypting File System, Part 2," *Windows & .NET Magazine* (Jul. 1999), available at http://winntmag.com/Articles/Index.cfm?ArticleID=5592&Key=Internals, 5 pages.

VeriFone Inc., "VeriFone Payment Solutions: Point-of-Sale PINpads" (1997-2004), available at http://www.verifone.com/products/printers_peripherals/html/pinpad_family.html, 1 page.

Whatis.com Target Search™, "PKI" (Jan. 13, 2004), available at http://whatis.techtarget.com/definition/0,289893,sid9_gci214299,00.html, 4 pages.

Datakey; "Securing a Virtual Private Network with Smart Card Technology"; Jun. 1, 2002; available at www.datakey.com; pp. 1-8.

Sun Microsystems, Inc. Java Cryptography Architecture API Specification & Reference, Aug. 4, 2002, 56 pages.

Java Skyline: Java Servlet/Server Headline News, Oct. through Dec. 1998, pp. 1-3.

MATLAB Installation Guide for PC, Release 11, The MathWorks Inc, 1999.

Microsoft Systems Management Server 2.0 Resource Guide, Microsoft Press, 1999. ISBN 0-7356-0583-1.

Windows NT Server 4. Garms, Jason. SAMS Publishing, 1998. ISBN 0-672-31249-2.

A. Menezes, P. van Oorschot and S. Vanstone, Handbook of Applied Cryptography, cr8523_01[1].pdf, Chapter 1, 48 pages.

A. Menezes, P. van Oorschot and S. Vanstone, Handbook of Applied Cryptography, cr8523_1 0[1 ].pdf, Chapter 10, 40 pages.

A. Menezes, P. van Oorschot and S. Vanstone, Handbook of Applied Cryptography, cr8523_12[1].pdf, Chapter 12, 53 pages.

FLEXlm End Users Guide, Version 9.2. Jul. 2003. Published by Macrovision. 166 pages.

* cited by examiner

LICENSE MODES IN CALL PROCESSING

FIELD OF THE INVENTION

The present invention relates generally to the licensing of computational components and specifically to the licensing of computational components in telecommunication systems.

BACKGROUND OF THE INVENTION

To protect software manufacturers' copyrights in software sold to the public, manufacturer's commonly license software to the purchaser. Additionally, in many applications the purchaser has elected to pay only for certain features of software which must be selectively enabled by the manufacturer. In particular, each release or version of a particular software package for a customer premise telecommunication switching system contains a large number of features, and most customers elect to pay for only a subset of the total number of features. Features in a telecommunications switching system refer to certain specialized operations such as call hold, call transfer, automatic route selection, etc. An ongoing problem in the art is to prevent newer versions of software from being pirated and used on unauthorized hardware and/or otherwise authorized customers from actuating features for which the customer has not paid.

A number of methods have been developed to protect against such unauthorized use of software.

In one method, passwords, that allow only authorized individuals to have access to the telecommunication switching system, are used to control enablement of features or new software versions. This method is inflexible and inconvenient for customers as an authorized technician must be scheduled to enable the features, can be circumvented by a person misappropriating or misusing the password, and does not provide for periodic license verification during system operation.

In another method, a key is required to enable the software program. This solution does not solve the copying problem because the key is normally printed on the packaging of the software, and anyone can install the software as many times as they wish, however illegal it may be.

In yet another method, a special piece of hardware or "dongle" is used. The dongle is a special piece of hardware that connects to the serial or parallel port of the computer. The software running on the computer sends a random number to the dongle. The dongle performs a secret computation and returns a result. The software makes a like computation; if the two computations match, the software continues to run. To work satisfactorily, the response must include feature and version information. The use of the dongle is cumbersome when it fails. In the event that the dongle fails, the system is down until a new dongle can be physically obtained on site. Also, once made the dongle is fixed. If it was used for feature activation, a new dongle is required for each additional feature that is purchased.

A further method is to freely distribute CD-ROM disks. When the CD-ROM is inserted into a computer, the computer automatically connects to a remote server via the Internet or a dial-up connection to receive a machine-specific key. The key unlocks the software so that it can be utilized on that computer. The remote server also obtains the necessary payment information from the computer user. This method does not function well for a telecommunication switching system since it does not provide for the authorization to use different features of the same software application nor is it dependent on the version of the software being requested. In addition, it does not provide the necessary authorization of personnel to make such a request.

Another method requires the software, upon installation or first execution, to record serial number information (e.g., medium access control or MAC address) regarding predetermined hardware components of the computer system. The software permits the user a specified number of hardware serial number changes before it disables itself. This method, though effective, is unfair to users who, over time, legitimately exceed the number of permitted serial number changes through reuse of the software on a number of different systems and/or periodic replacement of some of the predetermined hardware components in a given system to upgrade or maintain the system.

The drawbacks of the various licensing methods discussed above are addressed by the licensing method discussed in detail in copending U.S. patent application entitled "Securing Feature Activation in a Telecommunication System", Ser. No. 09/357,679, filed Jul. 20, 1999, to Serkowski, which is incorporated herein by this reference. In this method, a valid license file is required to run a computational component. The license file contains a serial number that must be present on the hardware that is to execute the licensed software for the license to be valid and the software to be executable. In telecommunication applications, for example, the serial number of the control processor must be in the license file for the control processor to run the licensed software.

The license file also contains a name and/or version of the licensed telecommunication application and licensed features. The data structures corresponding to the features are of two types. In a type 1 feature, the data structures reflected enablement or disablement of the corresponding feature using a simple on/off state. Examples of features falling into this category include abbreviated dialing enhanced list, audible message waiting, vectoring, answer supervision by call classifier, ATM trunking, agent states, dial by name, DCS call coverage, echo cancellation, multifrequency signaling, and wideband switching. In a type 2 feature, the data structures include a single numeric value and/or a name kind of entry. Examples of features falling into this category include logged-in agents, offer category, maximum numbers of concurrently registered IP stations, administered IP trunks, ports, and concurrently administered remote office stations/trunks, and call center release.

A drawback of all of the above licensing methodologies is that the computational system is either completely enabled or completely disabled, depending upon whether or not a specified licensing protocol is satisfied. There are situations in which it is desirable for the system to be operational even if the licensing protocol is not satisfied. During system maintenance and/or hardware replacement the customer could potentially be out of service until a new license is generated and installed. Alternatively, the licensing algorithm and/or system configuration can malfunction causing system shutdown. In many applications such as telecommunication applications, such outages can not only place great demands on maintenance personnel but also create customer dissatisfaction and cause lost sales revenue. Moreover even when a customer fails to obtain a valid license for a telecommunication application or feature thereof, it is often desirable for the system to remain operational to permit customers to make emergency (e.g., 911) telephone calls and/or maintenance calls for licensing enablement.

SUMMARY OF THE INVENTION

These and other needs are addressed by the various embodiments and configurations of the present invention. To control unlicensed uses of the computational component, the present invention provides a method and system that uses a plurality of differing licensing modes and/or differing degrees of enablement of the computational component.

In one embodiment, a method for protecting actuation of a computational component is provided. The method comprises the steps of:

(a) providing a computational component operating in a first licensing mode;

(b) identifying the occurrence of a predetermined licensing event (e.g., a licensing error is discovered during a periodic licensing file check);

(c) in response to the identifying step, causing the computational component to operate in a second licensing mode, the second licensing mode being different from the first licensing mode, wherein in each of the first and second licensing modes a common set of features performed by the computational component are enabled.

The computational components can be any entity capable of performing a task or executing instructions, e.g., a logic-containing board or chip such as an application specific integrated circuit or ASIC, a (control) processor, software, etc. In one configuration, the computational component is a license-controlled telecommunication application.

The first licensing mode is typically employed when the computational component has a valid license. In one configuration, the first licensing mode is known as the license-normal mode. In the first licensing mode, the computational component is typically fully (functionally) enabled.

The predetermined licensing event can be any event the occurrence of which is associated with an unlicensed operation. For example, the predetermined event can be an attempt by unauthorized personnel to modify, copy or alter the computational component, the use of an unauthorized code, password, identifier, serial number, or key, and the use of the computational component in the absence of a valid license. In a telecommunication architecture, the licensing event is typically defined as one or more of a valid license not being properly installed, the license file containing a serial number that fails to match the serial number of the processor (simplex configuration) or a plurality of serial numbers that do not match the serial numbers of a similar plurality of processors (multiple processor configuration (e.g., duplex configuration)), the name and/or version number of the telecommunication application failing to match the name and/or version number in the license file, the license being expired, the offer category in the feature mask failing to match the translation of the switch/server, feature usage in the translation exceeding limits in the feature mask, and a WAN spare processor being in the active state.

The second licensing mode is associated with one or more of the above events. In one configuration, the second licensing mode is known as the license-error mode.

The set of commonly enabled features in both the first and second licensing modes can include any set of selected operations of an algorithm. In telecommunication applications, the features include one or more of the following call processing functions such as call vectoring, voice mail, restrict call forward off net, Digital Communication System or DCS internetworking, enhanced conferencing, IP trunks, maximum number of ports, holiday vectoring, and automatic call distribution. In one configuration, in the first and second licensing modes the same features are enabled.

The second licensing mode can be in effect only for a predetermined time during which the customer must correct the licensing event. If the licensing event is not corrected with the predetermined time, the second licensing mode is changed to a third licensing mode (which is commonly referred to as the no-license mode). In this mode, the computational component is fully or partly disabled such that the features in the common set of features above are at least partly disabled. For example, the call processing functions can be disabled except for incoming and outgoing calls to a predefined set of numbers (such as calls to an internal or external emergency number such as a 911 call, outgoing calls to maintenance personnel, and incoming calls to a selected number for system maintenance).

The method and system of the present invention can have a number of advantages. First, the present invention can effectively protect and control actuation of one or more computational features, one or more applications, and any other type or form of computational algorithm, while providing an alternative licensing mode in which the computational system is not completely disabled when a specified licensing protocol is unsatisfied. During system maintenance and/or hardware replacement the customer does not have to be out of service until a new license is generated and installed. This feature thus permits maintenance personnel to fix a problem without incurring a loss of service due to the absence of a license and to replace hardware without loss of service when a matching license cannot be obtained immediately. Second, the licensing algorithm and/or system configuration can malfunction without causing system shutdown. This licensing mode thereby substantially lowers demands on maintenance personnel and avoids customer dissatisfaction. Third, in telecommunication applications even if a valid license were not obtained by the customer for a telecommunication application or feature thereof and the telecommunication application were to enter into the third licensing mode, the system would not be completely disabled but would continue to remain operational to permit customers to make emergency (e.g., 911) telephone calls and/or maintenance calls for licensing enablement. These and other advantages will be apparent from the disclosure of the invention(s) contained herein.

The present application is related to U.S. patent application Ser. No. 10/232,906, entitled "REMOTE FEATURE ACTIVATOR FEATURE EXTRACTION" to Walker et at.; Ser. No. 10/231,999, entitled "FLEXIBLE LICENSE FILE FEATURE CONTROLS" to Walker et al.; Ser. No. 10/232,507, entitled "LICENSE FILE SERIAL NUMBER TRACKING" to Serkowski et al.; Ser. No. 10/231,957, entitled "LICENSING DUPLICATED SYSTEMS" to Serkowski et al.; and Ser. No. 10/232,647, entitled "SOFTWARE LICENSING FOR SPARE PROCESSORS" to Walker et al., each of which is filed concurrently herewith and is incorporated herein by reference.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
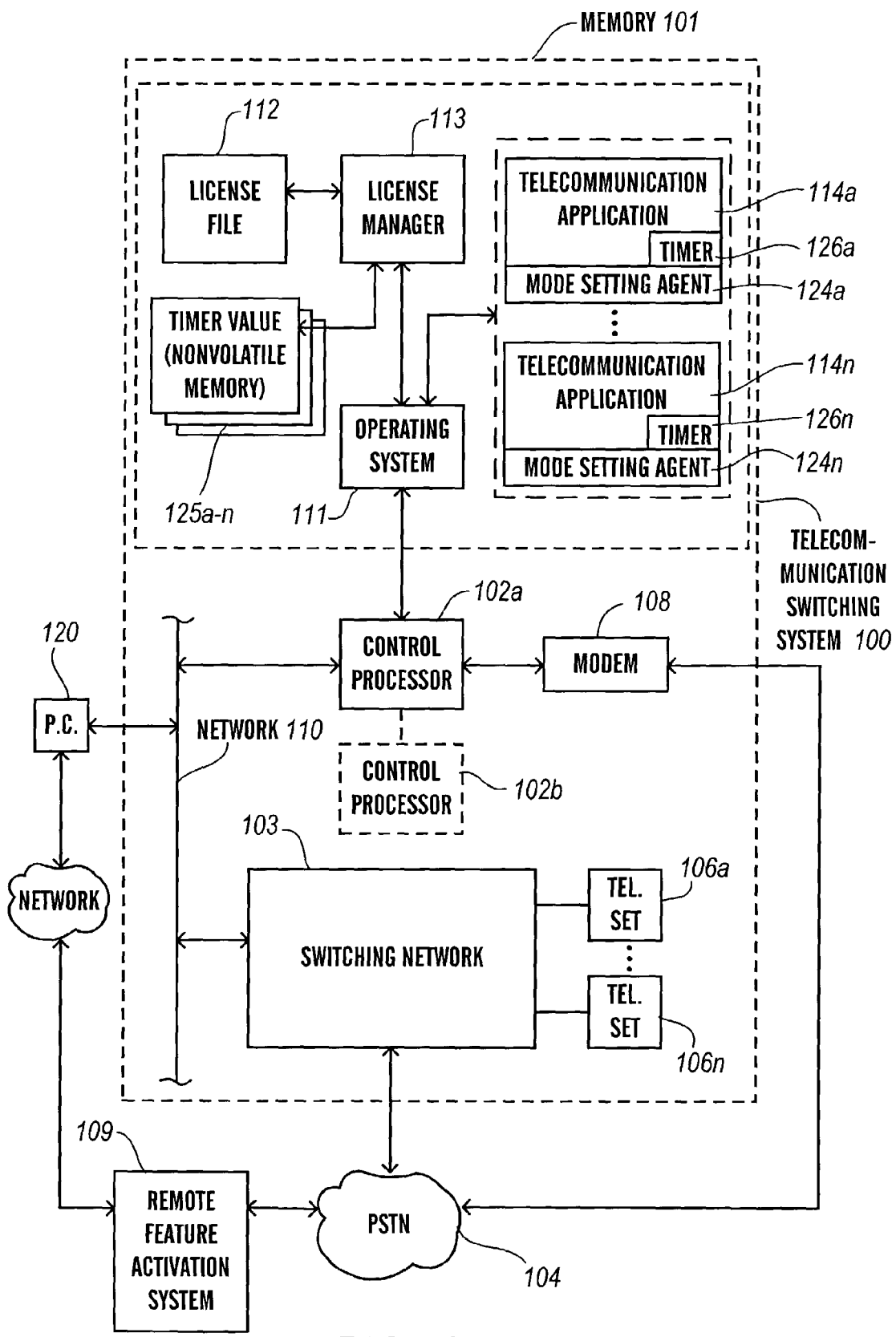
FIG. 1 depicts a telecommunication switching system according to an embodiment of the present invention.

FIG. 1 illustrates telecommunications switching system 100 interconnected to public telephone network 104. Telecommunications switching system 100 comprises telephone sets 106. The features and operations provided by telecommunication switching system 100 to telephones 106a-n and its interactions with public telephone network 104 are well known in the art. Illustratively, the switching system of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference, or Avaya Inc.'s DEFINITY™ private-branch exchange (PBX)-based ACD system.

One of the duplex control processors 102 executes telecommunication application 114a-n (each of which comprises a mode setting agent 124) via operating system 111 to perform the telecommunication functions and features. Primary and backup control processors 102a and b execute instructions in memory 101, such as license manager 113 and telecommunication applications 114a-n, and communicate with switching network 103 via network 110. One skilled in the art can readily envision that control processor(s) 102 can communicate with switching network 103 via a direct connection such as a connection via the processor bus of control processor(s) 102.

Operating system 111 is a conventional operating system allowing for the execution of applications such as telecommunication application 114 and for the intra-application communication of messages. The telecommunication application can be any application(s) and/or feature(s) used in telecommunication systems, such as DEFINITY™ by Avaya, Inc.

Personal computer (PC) 120 is utilized by service personnel to administer telecommunication switching system 100.

Switching (or server) network 103 provides all of the necessary telecommunication switching and interfacing that is required in telecommunication switching system 100.

License manager 113 periodically verifies that the telecommunication switching system 100 is being operated in accordance with pertinent licensing rules and disables the system 100 or an operational part of the system 100 when licensing rules are violated (or a predetermined licensing event occurs). During initialization of the switch software, during the restoration of translations, and periodically as the switch is running, a query is made by the telecommunication application to the license manager 113. The license manager 113 reads license file 112, compares the serial number(s) in the license file 112 with a serial number in the switch hardware, compares the software name and/or version in the license with the name and/or version of the telecommunication application 114a-n or operational part thereof, and, if a match occurs, delivers permission to run the telecommunication application 114a-n or operational part thereof with the feature mask in the license file. The feature mask controls revenue-associated options.

Figure 2:
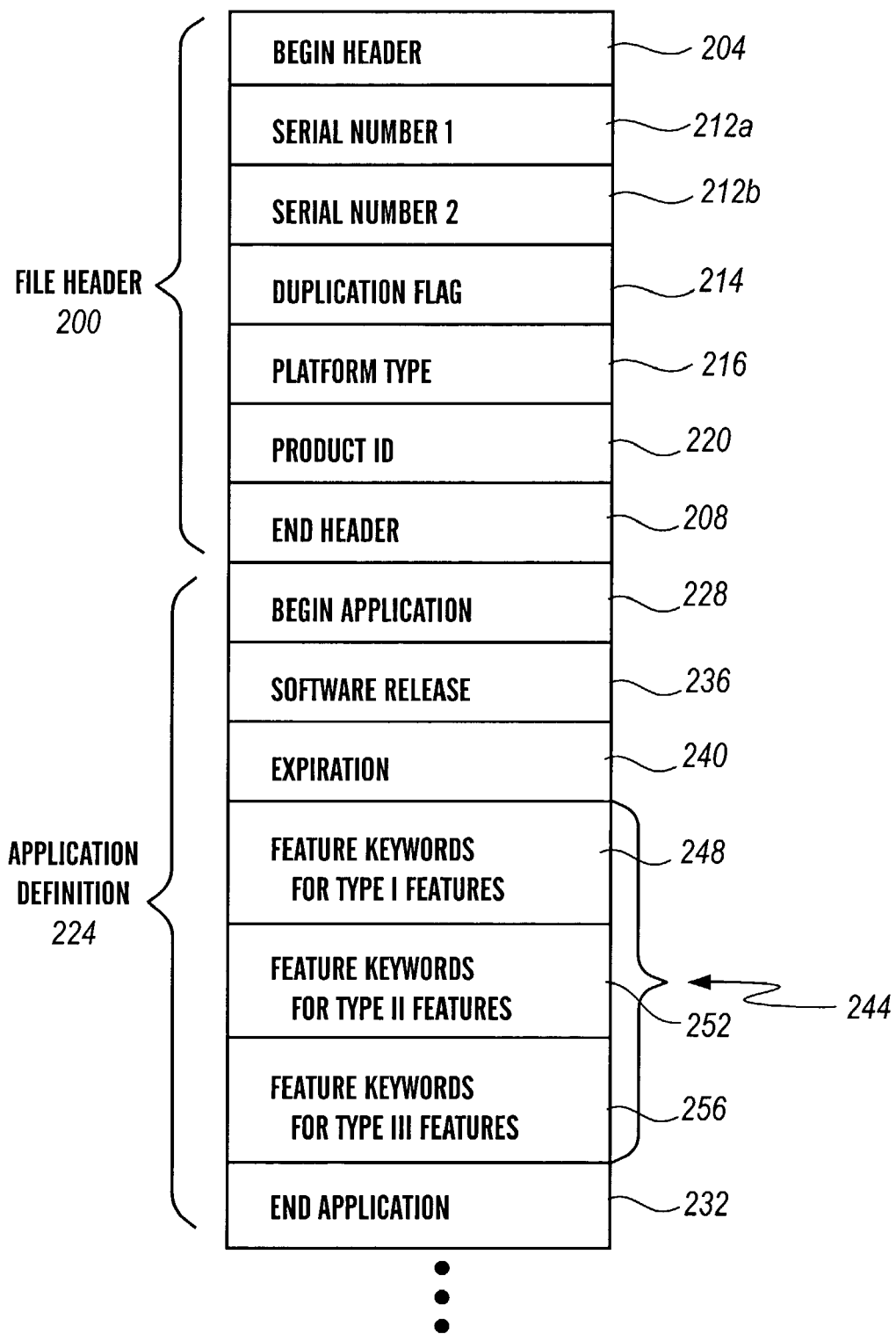
FIG. 2 depicts a license file according to another embodiment of the present invention.

Referring to FIGS. 1 and 2, the license file 112 includes a file header 200 which includes header beginning and ending fields 204 and 208 respectively, serial number fields 212a and b (each containing a serial number associated with one of control processors 102a and 102b), duplication flag field 214 (containing an indicator of whether there is a duplicated control processor (or two serial numbers) in the system 100, e.g., a simplex or duplex configuration), a platform type field 216 (containing first platform information such as the product type and name and/or version of product that the license is for), and a product identifier or PID field 220 (containing second platform information different from the first platform information such as a product identifier used at the platform level for accessing Access Security Gateway or ASG keys) and one or more controlled application definitions 224 each of which includes controlled application beginning (which names the application, e.g., "DEFINITY"™ by Avaya, Inc.) and ending fields 228 and 232, respectively, a software release field 236 (identifying software release version for which the license is granted), an expiration field 240 (expiration date of the license), and a feature mask 244 (providing information relating to the features to be enabled). In some applications, the duplication flag field 214 is contained in each application definition 224 and not in the file header 200.

In one configuration, the feature mask is configured as discussed in detail in copennding U.S. patent application Ser. No. 10/231,999, entitled "Flexible License File Feature Controls" to Walker et at., filed concurrently herewith and incorporated herein by this reference. The content of the mask controls what features are enabled or may be enabled on the product. There are three types of entries corresponding to fields 248, 252, and 256 in the feature mask.

The first type of entry (or Type I feature) in field 248 relates to those types of features that have a simple on/off state. The feature is either enabled or disabled. Each of these types of entries has two variables associated with it, namely a value and a lock. The value variable can be either on or off and the lock variable either locked or unlocked. Examples of features falling into this category include (in addition to the Type I features identified above in the background) Digital communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless.

The second type of entry (or Type II feature) in field 256 relates to those types of features that have a numeric value. The value can correspond to a numeric value and/or name kind of entry. Each of these types of entries has two values associated with it, namely a lower limit value and an upper limit value. The lower limit value is never greater than the upper limit value. Examples of features falling into this category include (in addition to the Type II features identified above in the background) logged-in automated call distribution or ACD agents, maximum currently registered IP stations, maximum administered IP trunks, offer category, maximum number of ports, maximum number of administered remote office trunks, and maximum number of mobile stations.

The third type of entry (or Type III feature) in field 256 relates to those types of features that have a product value (e.g., corresponding to a product name or type), a release number (e.g., referring to a product release identifier), and a numeric value (e.g., indicating an operational parameter associated with the product and/or release, such as how many ports are licensed and/or how many licenses for the product are granted. This type of feature allows other controlled applications to be executed. Like the second type of entry, each of these types of entries has two values associated with it, namely a lower limit value and an upper limit value. The lower limit value is never greater than the upper limit value.

When duplicated processors are used such as shown in FIG. 1, a separate license file can be saved for each processor or a common license file for both processors. Because duplicated processors share translation, typically only one copy of the license file is installed, though the file is saved to two flash cards (one for each processor). If either of the two processors is replaced, the license file must be replaced.

Referring again to FIG. 1, a remote feature activation system 109 generates the license file that is transmitted to the switching system 100 upon installation or provisioning of the system. Remote feature activation system 109 is discussed in detail in copending U.S. application Ser. No. 10/232,507, entitled "License File Serial Number Tracking", to Serkowski et at., filed concurrently herewith and incorporated herein by this reference. Alternatively, the license file is installed by authorized personnel via PC 120.

Modem 108 is directly connected to control processor 102 so that control processor(s) 102 can contact remote feature activation system 109 via public telephone network 104. Similarly, remote feature activation system 109 can establish a communication channel with control processor 102 via public telephone network 104 and modem 108. One skilled in the art can readily envision that modem 108 can be interconnected to control processor(s) 102 via LAN 110.

Each telecommunication application 114a-n can include a corresponding mode setting agent 124a-n to set the licensing mode of the system 100. The mode setting agent 124 can set one of three operational modes to the system 100.

In the LICENSE NORMAL mode, the license manager has found that a valid license is properly installed, the license file contains a serial number that matches the serial number of the processor (simplex configuration) or a plurality of serial numbers that match the serial numbers of a similar plurality of processors (multiple processor configuration (e.g., duplex configuration)), the software name and version/release of the telecommunication application matches that in the license file, the license has not expired, the offer category in the feature mask matches the translation, the feature usage in translation does not exceed limits in the feature mask (e.g., a feature limit is a capacity value associated with a type 2 or type 3 feature), and if the processor is a wide area network (WAN) spare processor (WSP), survivable remote spare processor (SRP), or local spare processor (LSP), the processor is not active.

In the LICENSE ERROR mode, the license manager has found one or more of the following: no valid license is properly installed, the license file contains a serial number that does not match the serial number of the processor (simplex configuration) or a plurality of serial numbers that do not match the serial numbers of a similar plurality of processors (multiple processor configuration (e.g., duplex configuration)), the license has expired, the feature usage exceeds limits (e.g., there are more ports translated than permitted by the port limit in the license file which can occur when translations are copied from another switch or when a new license file is installed that has lower limits than the previous license ifie) and the processor is a WSP, SRP, or LSP that is active. As discussed in copending U.S. patent application Ser. No. 10/231,999, entitled "Flexible License File Feature Controls", to Walker et al., filed concurrently herewith and incorporated herein by this reference, if there is a mismatch between the existing translation and the license file for a locked first type of entry the feature on/off state is simply updated to match the license and does not cause entry into LICENSE-ERROR mode. The LICENSE-ERROR mode is cleared by correcting the error that caused entry into the mode or by installing a valid license that is consistent with the configuration of the system 100. In the LICENSE-ERROR mode, the telecommunication application is permitted to run for a predetermined period of time or grace period. License error timer 126 (FIG. 1) is used to monitor the grace period. Each timer 126a-n is maintained by a corresponding telecommunication application in memory. In order to preserve the timer value across reboots, timer values 125a-n(each of which corresponds to a timer 126a-n) are saved once every hour in nonvolatile memory. The application 114 reads the timer values 125a-n from memory on bootup and uses them to set the correct timer value of the corresponding timer 126a-n in the application's memory.

In one configuration, all call processing functions of the telecommunication application are permitted to run during the LICENSE-ERROR MODE. Thus, the customer will realize the same level of service in both the LICENSE-NORMAL and LICENSE-ERROR modes.

In the NO-LICENSE mode, the license manager has found that (i) the corresponding license error timer 126a-n is expired and one or more of the following: there is no valid license installed on the system, the feature usage exceeds limits, the license file contains a serial number that does not match the serial number of the processor (simplex configuration) or a plurality of serial numbers that do not match the serial numbers of a similar plurality of processors (multiple processor configuration (e.g., duplex configuration)), the license is expired, and the processor is a WSP, SRP, or LSP that is active; (ii) the name and/or version of the telecommunication application does not match the name and/or version in the license file; and/or (iii) the offer category in the feature mask does not match translation. In the NO-LICENSE mode, all new call originations (except alarm calls (e.g., 911 calls) and calls to an administered emergency number) are denied and all incoming calls (except calls to an administered number) are denied. This mode is cleared by correcting the error that caused entry into the mode or by installing a valid license that is consistent with the configuration of the switch.

Figure 3:
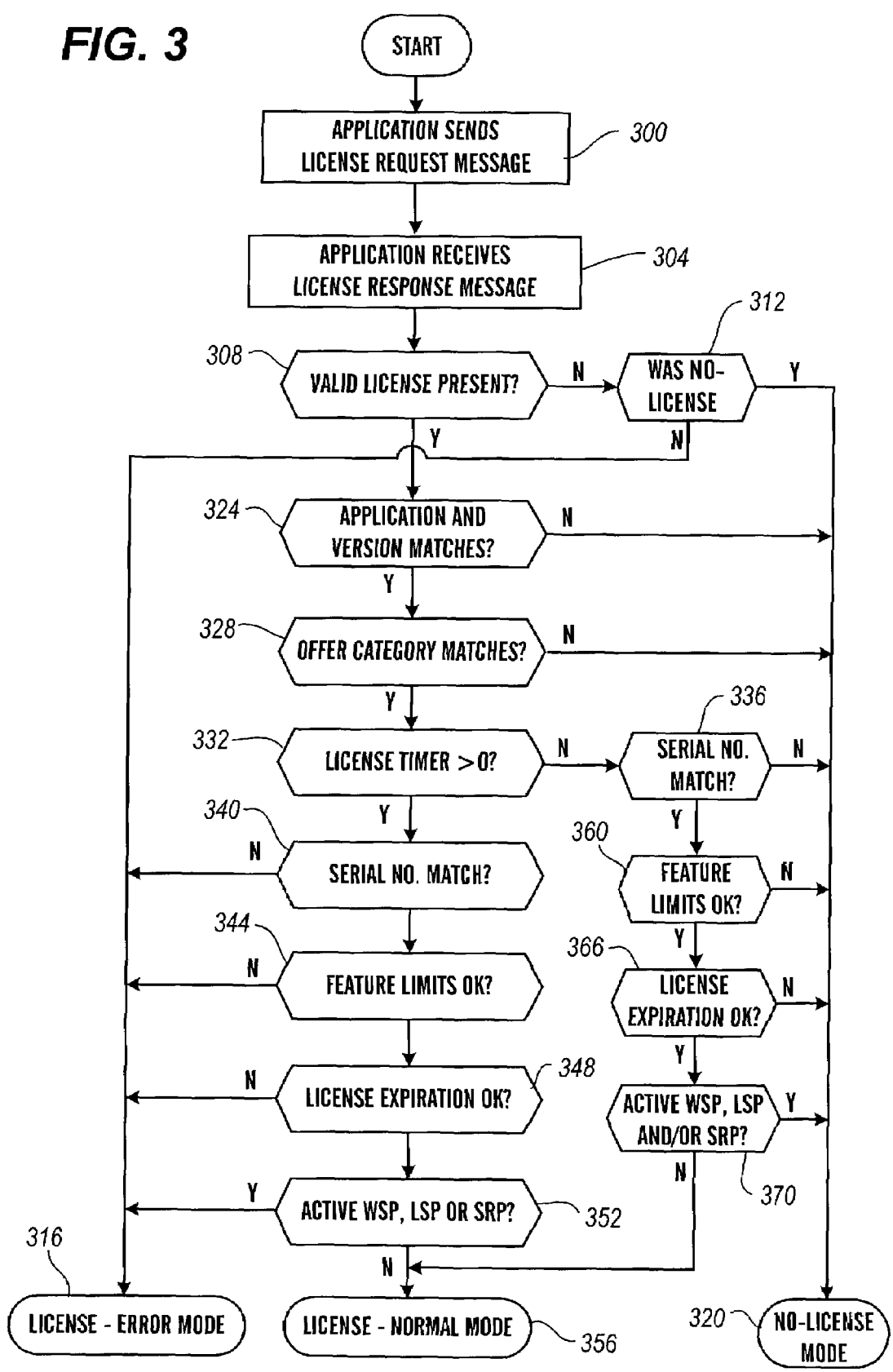
FIG. 3 is a flow chart depicting an algorithm of the telecommunication application according to yet another embodiment of the present invention.

The operation of the license manager 113 and mode setting agent 124 will now be discussed with reference to FIGS. 3 and 4A and 4B. The process begins in step 300 of FIG. 3 when the mode setting agent 124 sends, such as at initialization of the application, periodically during execution of the application, or when a new license is installed, an encrypted message to the license manager 113 via operating system 111. The encrypted message includes a request for permission to run, a request for a list of permitted features, the name and version number for the telecommunication application 114 (making the request), and the date and time of the request. The request may also include a request for the value of the timer 124.

Figure 4A:
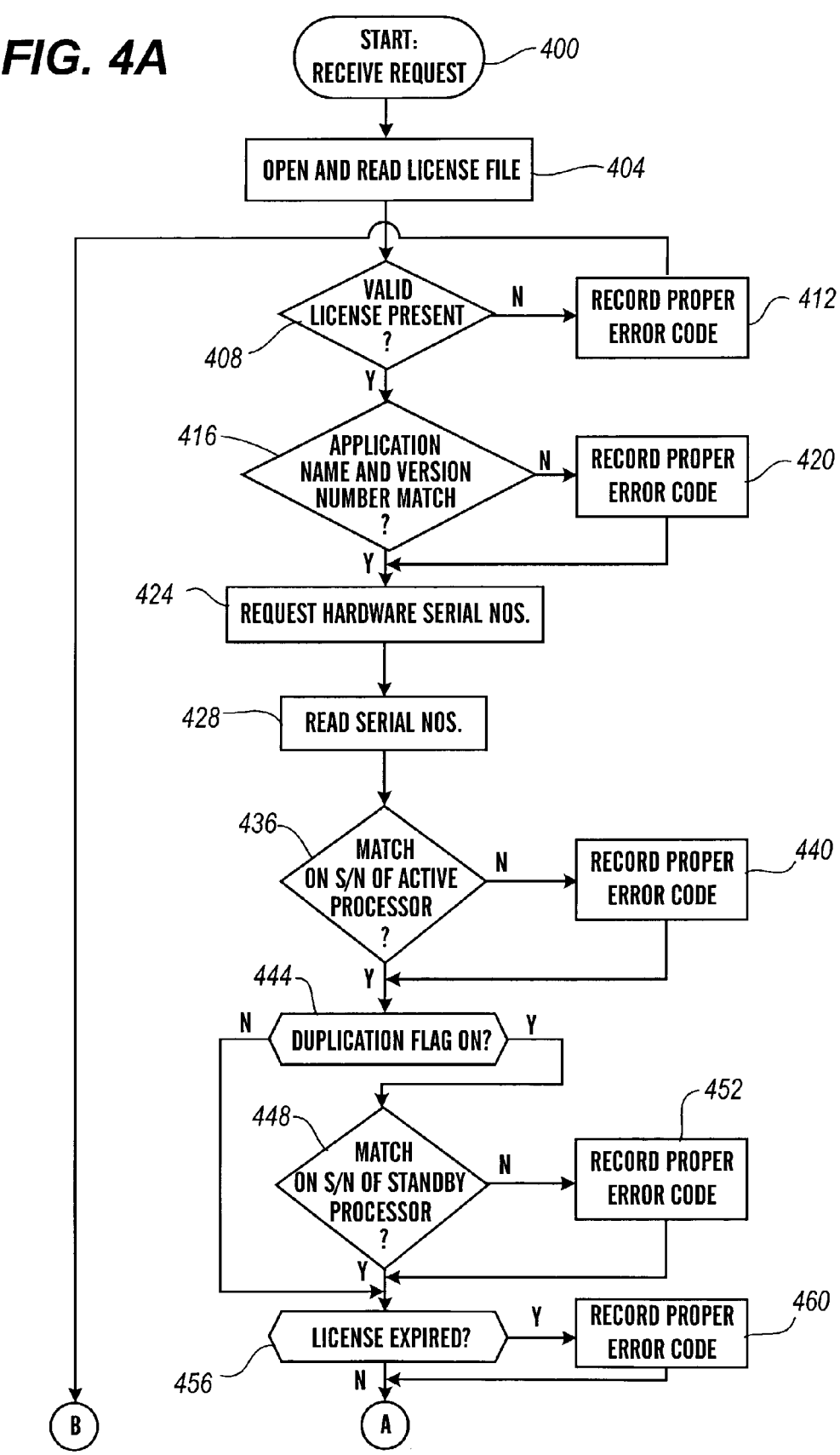
FIGS. 4A and 4B are flow charts depicting an algorithm of the license manager according to a further embodiment of the present invention.
Figure 4B:
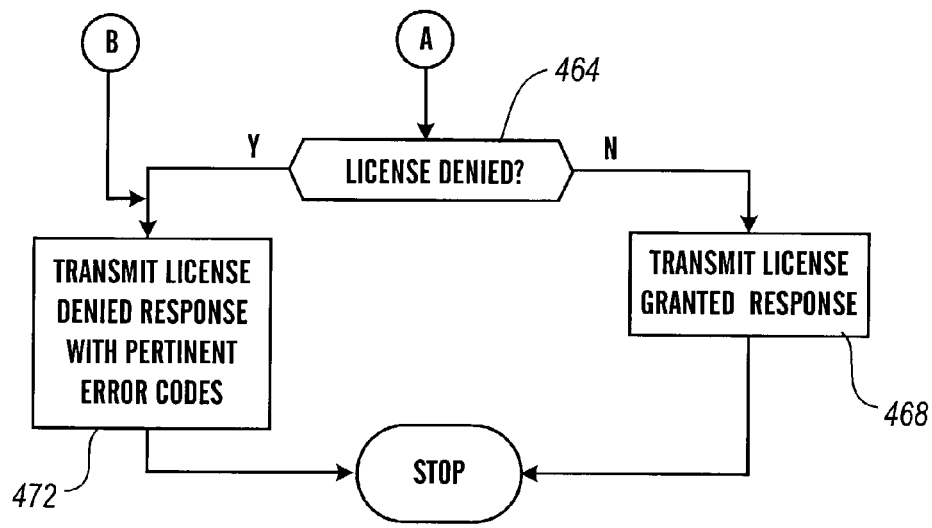

The request is received by the license manager 113 in step 400 of FIG. 4A. The license manager 113 decrypts the request and in response to the encrypted message attempts to open, decrypt, and read the license file 112 in step 404. In step 408, the license manager determines whether or not the license file is present and valid. This query determines whether there is a license file available, whether the license file is readable, and whether the license file is in the proper format. If any one of these checks has a negative result, the manager 113 concludes that the license file is invalid. When the license file is invalid, the manager 113 records in step 412 the error code corresponding to the fact of and/or reason for license file invalidity and proceeds to step 472 (discussed below).

In step 416, the manager 113 reads license file 112 to obtain the list of permitted features, name and/or version number of telecommunication application 114, and the serial number(s) of control processors 102a and 102b. For security reasons, the license file is stored in an encrypted form. As will be appreciated, the encryption can be performed using one or more keys. The manager 113 then determines whether or not the name and/or version number for the telecommunication application 114 matches the name and/or version number in the decrypted license file. If not, the manager 113 in step 420 records the error code corresponding to an unmatched name and/or version number.

In step 424, the manager 113 forwards a serial number request to each of the processors 102a and 102b. Control processors 102a and b each are assigned a unique electronically readable serial number that is set during board manufacture. If one or both of the processors 102 fails to respond to the serial number request after a predetermined time period and/or after a predetermined number of requests, manager 113 assumes that the processor 102 is unavailable. It is typically desired to resend serial number requests in the event that no response is received, as the processor may be resetting (e.g., after a firmware update) at the time of the initial serial number request.

In step 428, the manager 113 determines whether each of the processors 102a and 102b has responded and is therefore present. If not, the manager 113 in step 432 records the proper error code for the corresponding unavailable processor.

In step 436, the manager 113 determines if the serial number of the active processor matches either of the two serial numbers in the license file. If not, the manager 113 in step 440 records the proper error code for an unmatched serial number.

In step 444, the manager 113 determines whether the duplication flag is on or set. The duplication flag may be configured in any suitable manner, such as a bit having two values, 0 and 1, each of which indicates a different predetermined duplication state. For example, a "0" value indicates no duplication and a "1" value duplication. When the duplication flag is on, the manager 113 proceeds to step 448 and determines whether the serial number of the standby processor 102b matches either of the serial numbers in the license file. When the system is a duplex system and one or both serial numbers of the processors do not match either of the serial numbers in the license file, the manager 113 in step 452 records the proper error code for an unmatched duplicated processor serial number.

In the event that the duplication flag is off or after either of steps 448 or 452, the manager 113 determines in step 456 whether or not the license is expired. When the expiration date in the license file is earlier than the current date and time, the license is considered to be expired. When the license is expired, the manager 113 in step 460 records the proper error code for an expired license.

In step 464, the manager 113 decides whether the license is to be denied or granted. The license is denied when one or more error codes is recorded during the preceding steps. The license is granted when no error codes are recorded.

When the license is granted, the manager 113 generates a license granted response in step 468. The response includes an indication that the license is granted and the feature mask of the license file. The message is encrypted and forwarded to the mode setting agent 124.

When the license is denied, the manager 113 generates a license denied response in step 472. The response includes an indication that the license is denied, the error code(s) corresponding to the reason(s) for license denial, and the feature mask. The feature mask is not returned if the error is "no valid license present" since there is no feature mask to return without a valid license. When the license is denied for more than one reason, error codes for all of the reasons for license denial are included in the license denial response. The message is encrypted and forwarded to the mode setting agent 124.

Referring again to FIG. 3, the mode setting agent 124 in step 304 receives the encrypted license response from the manager 113 and decrypts the response. As discussed below, the mode setting agent 124 parses through the various fields of the license response to set the license mode.

In step 308, the agent 124 determines whether the manager 113 found a valid license to be present. If a valid license is not present, the agent 124 determines in step 312 whether the current license mode of the system 100 is the NO-LICENSE mode. When the current mode is not the NO-LICENSE mode, the agent sets the mode to the LICENSE-ERROR mode in step 316. When the current mode is the NO-LICENSE mode, the agent leaves the system in the NO-LICENSE mode in step 320. If a valid license is present, the agent 124 proceeds to step 324.

In step 324, the agent determines whether the manager found that the application name and/or version matched the name and/or version in the license file. If not, the agent proceeds to step 320 in which the mode is set to the NO-LICENSE mode. If so, the agent proceeds to step 328.

In step 328, the agent determines whether the manager found that the offer category matches the translation. If not, the agent proceeds to step 320 in which the mode is set to the NO-LICENSE mode. If so, the agent proceeds to step 332.

In step 332, the agent determines whether the value of the license error timer 124 is greater than zero. The application 114 maintains the license error timer value in memory. When the license timer value is zero, the agent proceeds to step 336 (discussed below), and when the license timer value is greater than zero the agent proceeds to step 340 (also discussed below).

In one configuration, the value of the license error timer value is periodically saved in nonvolatile memory of each of the processors so that the timer can be preserved across system resets. To make this possible, the mode setting agent makes not only a license file request but also a timer save request at predetermined intervals. The license timer value passed to the manager 113 for storage is set as follows: (a) if the system 100 is in LICENSE-NORMAL mode, the license timer value shall be the full grace duration of period (6 days, or 144 hours in the case of DEFINITY), (b) if the system 100 is in LICENSE-ERROR mode, the license timer value saved shall be the time remaining on the corresponding license error timer 126a-n, and (c) if the system 100 is in NO-LICENSE mode, the corresponding license timer value saved is zero.

At initialization or any other time that the value is not available in memory, the agent issues a timer request to the license manager 113. To generate a timer response, the manager 113 queries each of the processors for the stored timer value. The lowest of these values (the value closest to expiration) is passed back to the agent in the timer response message. If any of the timer values from the processors are corrupted or if no processor responds with a timer value, the value in the timer response message to the agent is zero (indicating that the timer is expired). The agent uses the timer value in the response to set the timer value in memory.

Returning to FIG. 3, the agent in step 340 determines whether or not the manager 113 found that the serial number(s) match. When the serial number(s) do not match, the agent proceeds to step 316 (in which the license mode is set to the LICENSE-ERROR mode). When the serial number(s) match, the agent proceeds to step 344.

The agent in step 344 next determines if the manager found that the feature limits were being exceeded. When the limits are being exceeded, the agent proceeds to step 316. When the limits are not being exceeded, the agent proceeds to step 348.

In step 348, the agent determines whether the manager found that the license is expired. When the license is expired, the agent proceeds to step 316. When the license is not expired, the agent proceeds to step 352.

The agent next checks in step 352 the feature mask to see if the processor is a WSP, LSP, or SRP. If it is and the processor is active (i.e., not in the standby mode), then the agent sets the license mode to LICENSE-ERROR in step 316. If it is not, the agent proceeds to step 356.

Returning again to step 336, the agent determines whether the manager found one or more unmatched serial numbers. If not, the agent proceeds to step 320 in which the license mode is set to the NO-LICENSE mode. If so, the agent proceeds to step 360.

If in either of steps 360 and 366, the agent determines that the manager found the feature limits to be exceeded or the license to be expired, respectively, the agent proceeds to step 320.

If in both of steps 360 and 366, the agent determines if the manager found that the feature limits are within licensed limits and the license is unexpired, respectively, the agent proceeds to step 370.

In step 370, the agent determines whether the processor is an active WSP, LSP, or SRP. If so, the agent proceeds to step 320. If not, the agent proceeds to step 356.

As shown by steps 336, 360, 366, and 370, the timer value is relevant only if there is a license error. If there are no errors, the switch goes to LICENSE-NORMAL mode, even if the license error timer is expired. If this were not the case, there would be no way to get out of the NO-LICENSE mode once the timer had expired.

Whenever the system 100 enters the LICENSE-NORMAL mode, the agent clears any LICENSE-ERROR or NO-LICENSE alarms, stops the license error timer (if running) and resets the timer to the full duration of the grace period, and makes a timer save request of this duration to the license manager.

Whenever the system 100 enters the LICENSE-ERROR mode, the agent generates a major (license-error) alarm, logs the error into the system security log, and initiates the license error countdown timer.

Whenever the system 100 enters NO-LICENSE mode, the agent generates a major (no-license) alarm (that is different from the alarm generated by the agent on entry into the LICENSE-ERROR mode), logs the error into the system security log, and provides a timer save request of zero hours to the license manager.

When the system 100 is operating in the NO-LICENSE or LICENSE-ERROR mode, the alarm is presented to the user in a suitable mode or modes. For example, a suitable error message can be displayed on the initial login screen for the system and/or a key or other indicator can be illuminated on one or more telephone sets and/or on another part of the system hardware. The agent can also provide an alarm notification to outside service personnel.

Figure 5:
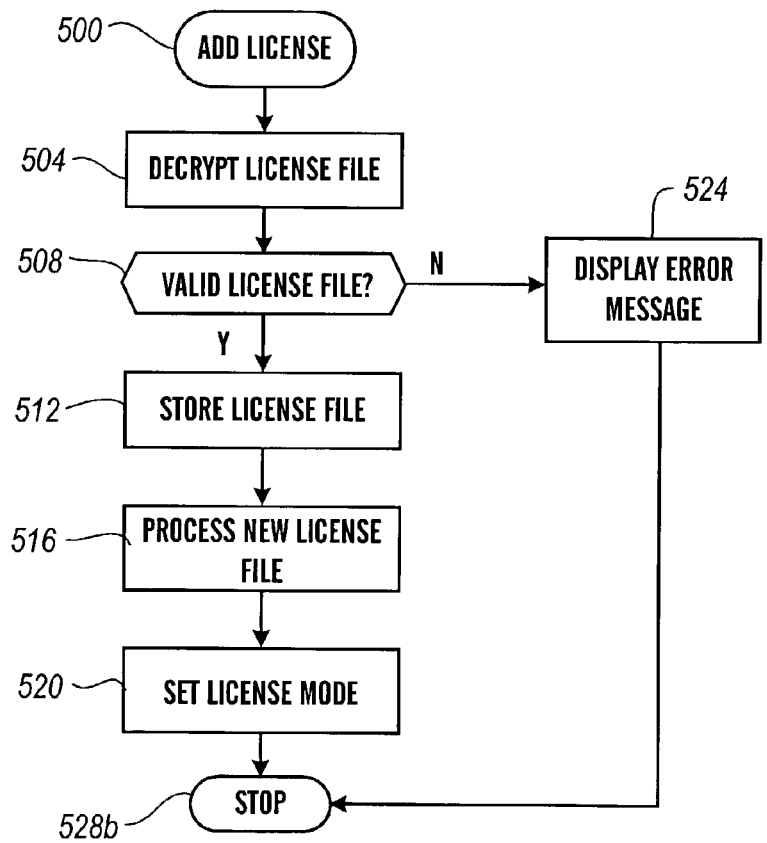
FIG. 5 is a flowchart depicting an algorithm of the license manager according to yet a further embodiment of the present invention.

FIG. 5 depicts the operation of the license manager when a new license file is received by the telecommunication switching system 100. In step 500, the ADD LICENSE command is invoked. In step 504, the license manager decrypts the new license file.

In step 508, the license manager performs a series of checks to determine if the license file is valid. The license manager confirms that the serial number contained in the license file matches the serial number of the active processor, that the license has not expired, that the version contained in the license file matches the software version loaded onto the switching system 100, that the offer category contained in the license file matches the offer category contained in the translation files of the system 100, data integrity using a checksum or other suitable approach, and that the license file length and format are correct.

If one or more of the preceding queries is not confirmed, the license manager proceeds to step 524 and displays a suitable error message to the user and terminates operation in step 528.

If each of the queries is confirmed, the new license file is stored in translation in step 512. The new license file overwrites the license file already in memory.

The license manager then processes the new license file in step 516. The license manager activates and deactivates features and sets new limits in accordance with the new license file.

Next in step 520, the license manager invokes the mode setting agent to set the license mode. If the mode was LICENSE-NORMAL, the new license file was successfully installed, no feature limits are exceeded, and the system is a simplex system, the mode remains LICENSE-NORMAL. If the preceding facts are true except that the system is a duplex system and if the duplicated processor has the correct serial number, the mode remains LICENSE-NORMAL. If the mode was LICENSE-NORMAL and the new license installed successfully but there were feature limits exceeded, the feature limits shall be set in step 416 as specified by the new license file, and the system shall enter the LICENSE-ERROR mode. If the mode was LICENSE-NORMAL and the new license file was not successfully installed, the mode remains unchanged. If the mode was LICENSE-ERROR, the new license installed successfully, no feature limits are exceeded, and the system is a simplex system, the mode is set to the LICENSE-NORMAL mode. If the preceding facts are true except that system is a duplex system and if the duplicated processor has the correct serial number, the mode is set to the LICENSE-NORMAL mode. If the mode was LICENSE-ERROR and the new license file was successfully installed but there were feature limits exceeded, the feature limits are set in step 416 as set forth in the new license file, the errors are logged, and an error message displayed. The license mode remains unchanged. If the mode was LICENSE-ERROR and the new license could not be installed, the mode is unchanged. If the mode was NO-LICENSE, the new license file was successfully installed, no feature limits are exceeded, and the system is a simplex system, the mode is set to LICENSE-NORMAL. If the preceding facts are true except that system is a duplex system and if the duplicated processor has the correct serial number, the mode is set to the LICENSE-NORMAL mode. If the mode was NO-LICENSE and the new license file was successfully installed but there were feature limits exceeded, the feature limits are set in step 416 as set forth in the new license file, the errors are logged, an error message displayed, and the mode remains NO-LICENSE. If the mode was NO-LICENSE and the new license file was not successfully installed, the mode remains NO-LICENSE.

A number of variations and modifications of the invention can be used. It would be possible to provide for some features of the invention without providing others.

For example in one alternative embodiment, the duplicated processors communicate with one another periodically (exchange serial numbers) in addition to, as part of, or in lieu of the periodic licensing verification analysis of the license manager 113.

In another alternative embodiment, the division of the various functions performed by the license manager and mode setting agent modules are different. For example, the license manager can perform all or part of the licensing-related functions of the mode setting agent or the mode setting agent can perform all or part of the licensing-related functions of the license manager.

In another alternative embodiment, the mode setting agent 124 is not a part of the telecommunication application 114.

In another alternative embodiment, the NO-LICENSE mode is entered in a stepwise fashion. First, no administrative changes would be permitted, then after a couple of days, displays would stop working, and then after a couple of more days outbound calls would be blocked. This behavior would give the customer a better warning regarding the impending loss of service.

In yet another alternative embodiment, the license manager and/or mode setting agent 124 are implemented as software and/or hardware such as a logic circuit, e.g., an application specific integrated circuit.

In yet another alternative embodiment, any other applications running on the telecommunication switching system 100 can utilize the same mechanism as the mode setting agent 124 to determine if they are to be allowed to execute and what options they execute.

In yet a further alternative embodiment, the above techniques are applied with other telecommunication and/or non-telecommunication computational architectures having duplicated computational components. The computational components can be hardware, software, or a combination of the two.

In yet a further alternative embodiment, the license file can include fields for any number of unique identifiers for the same or differing types of hardware components. For example, for a license verification to be successful the license manager could require that there be matches for serial numbers not only of a control processor but also of an application specific integrated circuit or another type of hardware component.

In yet another embodiment, unsuccessful license verification causes only the contacting telecommunication application and not other successfully validated telecommunication applications or other parts of the system to be set to a mode other than the LICENSE NORMAL mode.

In yet another embodiment, when in LICENSE-NORMAL mode, if the mode setting agent does not receive a license response from a license manager within a predetermined time period of issuing a license request, the agent automatically enters the LICENSE-ERROR mode. When in the LICENSE-ERROR mode for reason other than failure to receive a license response, or at system initialization, if the agent does not receive a license response from the license manager within the predetermined period of issuing the license request, the system 100 shall enter NO-LICENSE mode.

In yet another embodiment, the sets of features enabled/disabled in the LICENSE-NORMAL and LICENSE-ERROR modes are different. The features that can be enabled and disabled in each mode comprise call routing or vectoring, to name but a few. In the LICENSE-NORMAL mode all of these features are enabled. In contrast, only some of these features are enabled in the LICENSE-ERROR mode.

In yet another embodiment, the present invention is used to enable/disable an application executed by a server in addition to or in lieu of a switch. This embodiment is particularly useful in monitoring licensing in multi-mode contact centers which receive a broad variety of contact types, such as telephone calls, electronic mail, and contacts via a Web browser.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer readable medium encoded with processor executable instructions to perform at least the following steps:
   (a) receiving, by a license manager and from a computational component, a first message requesting permission to run;
   (b) in response to receipt of the first message, determining, by the license manager, whether a valid license file is present;
   (c) in response to determining that a valid license file is present, performing, by the license manager, at least the following sub-steps:
      (c1) determining whether at least one of a computational component name and version match a corresponding at least one of a name and version in the license file;
      (c2) determining whether a license error timer has a selected value;
      (c3) determining whether a serial number of the computational component matches a serial number in the license file; and
      (c4) determining whether a set of feature limits is exceeded;
   (d) determining, by a mode setting agent, a current licensing mode of the computational component;
   (e) selecting, by the mode setting agent, at least one of a no-license licensing mode, a license-error licensing mode, and a license-normal licensing mode, wherein, in each of the license-error and license-normal licensing modes, a common set of features performed by the computational component is enabled and operational and, in the no-license licensing mode, the common set of features is not enabled and is not operational, and wherein the licensing modes are selected by the mode setting agent according to the following rules:
- (e1) selecting the no-license licensing mode when the at least one of a computational component name and version fails to match the at least one of a name and version in the license file;
- (e2) selecting the license-error licensing mode when any of the following is true: (i) a valid license file is not present and the current license mode is a license-error mode, (ii) a valid license is present and the serial number of the computational component fails to match the serial number in the license file, and (iii) the set of feature limits is exceeded; and
- (e3) selecting the license-normal licensing mode when all of the following are true: (i) a valid license file is present, (ii) the serial number of the computational component matches the serial number in the license file; and (iii) the set of feature limits is not exceeded.

2. The medium of claim 1, wherein the steps of claim 1 are performed by a computer and wherein the common set of features comprises a plurality of call processing functions selected from the group call vectoring, voice mail, restrict call forward off net, Digital Communication System or DCS internetworking, enhanced conferencing, IP trunks, maximum number of ports, holiday vectoring, and automatic call distribution.

3. The medium of claim 1, wherein, when a valid license file exists and when the license timer has the selected value, performing, by the license manager, the following additional steps:
- (f) determining whether the serial number of the computational component matches the serial number in the license file;
- (g) determining whether the set of feature limits is exceeded;
- (h) determining whether the license is expired;
- (i) in response to the serial number of computational component matching the serial number in the license file, the set of feature limits not being exceeded, and the license not being expired, selecting the license-normal licensing mode; and
- (j) in response to at least one of the serial number of the computational component not matching the serial number in the license file, the set of feature limits being exceeded, and the license being expired, selecting the no-license licensing mode.

4. The medium of claim 1, wherein step (c) comprises the further sub-step:
- (c5) determining whether an offer category in the license file matches an offer category of the computational component; and further comprising:
- (f) when a valid license file is present, when the license error timer does not have the selected value, and when the offer category fails to match the offer category of the computational component, selecting the license-error licensing mode, wherein the license manager determines that a valid license file is present, the license error timer does not have the selected value, and the offer category fails to match the offer category of the computational component and therefore selects the license-error licensing mode.

5. The medium of claim 1, wherein the mode setting agent selects the license-error licensing mode only when the license error timer does not have the selected value.

6. The medium of claim 1, wherein, in step (e1), the mode setting agent selects the no-license licensing mode independent of the value of the license error timer.

7. The medium of claim 1, wherein the computational component has a valid license file and wherein the license file comprises first, second, and third types of features, the first type of feature relating to features having an on/off state, the second type of feature relating to features having a numeric value, and the third type of features having a product value, a release number, and a numeric value.

8. The medium of claim 1, wherein the license file comprises the following sets of fields: a serial number field indicating a serial number of a licensed computational component, a platform type field indicating at least one of a type, name, and version of the computational component, a release field indicating a release version of the licensed computational component, an expiration field indicating an expiration date of the license, and a feature mask, wherein the feature mask comprises identifiers of the first, second, and third types of features.

9. The medium of claim 7, wherein the first type of features comprises a plurality of the following: Digital Communication System or DCS call coverage, audible message waiting, vectoring, attendant vectoring, Asynchronous Transfer Mode or ATM Wide Area Network spare processor, ATM, dial by name, echo cancellation, multimedia call handling, multiple call handling, caller identification, multi-frequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless.

10. The medium of claim 7, wherein the second type of feature comprises a plurality of the following: logged-in automated call distribution or ACD agents, maximum currently registered IP stations, maximum administered IP trunks, offer category, maximum number of ports, maximum number of administered remote office trunks, and maximum number of mobile stations.

11. The medium of claim 2, wherein the no-license licensing mode is selected and wherein, in the no-license licensing mode, most new call originations are denied and most incoming calls are denied.

12. The medium of claim 1, further comprising:
- (f) generating an alarm notification indicating entry into the license-error licensing mode.

13. The medium of claim 1, wherein the no-license licensing mode is selected and wherein, in the no-license licensing mode, the computational component permits only outgoing and incoming calls involving a predefined set of numbers.

14. A computer readable medium storing processor-executable instructions to perform at least the following steps:
- (a) the license manager receiving from a computational component, a first message requesting permission to run, wherein the computational component is running in a license normal licensing mode when the message was generated by the computational component;
- (b) in response, the license manager determining whether at least one event of a first set of events applies, wherein the at least one event is determined, by the license manager, to be applicable;
- (c) in response to step (b), the computational component entering, directly from the license-normal licensing mode, a no-license licensing mode without first providing a user of the computational component with a grace period to correct the at least one of the first set of events, wherein, in the license-normal licensing mode, a set of features is enabled and performable by the computational component and, in the no-license licensing mode, the set of features is not enabled and not performable by the computational component.

15. The medium of claim 14, wherein the license response indicates that a valid license file is present, wherein the events in the first set of events comprise a plurality of the following: at least one of a computational component name and version failing to match at least one of a name and version in the license file, an offer category of the computational component failing to match an offer category in the license file, and a license error timer having a selected value and an event in a third set of events applies, wherein the events in the third set of events comprise a plurality of a serial number of the computational component fails to match a serial number in the license file, a set of feature limits has been exceeded, and a license expiration date has passed.

16. The medium of claim 14, wherein the steps of claim 14 are performed by a computer and further comprising:
(d) the license manager determining whether at least one of a second set of events applies:
(e) in the event that at least one of the second set of events applies, the computational component entering a license-error licensing mode in which a user of the computational component has a grace period in which to correct the at least of the second set of events; and, when no event in the first and second sets of events applies, the computational component enters the license-normal licensing mode, wherein, in each of the license-error and license-normal licensing modes, a common set of features are enabled and performable by the computational component and, in the no-license licensing mode, the common set of features is not enabled and not performable by the computational component, and wherein the license-error licensing mode, license-normal licensing mode, and no-license licensing mode are concurrently available for enablement.

17. The medium of claim 16, wherein the events in the second set of events comprise a plurality of (i) a valid license file is present, a license error timer does not have a selected value, and a serial number of the computational component fails to match a serial number in the license file, (ii) a valid license file is present, a license error timer does not have a selected value, and a set of feature limits has been exceeded, (iii) a valid license file is present, a license error timer does not have a selected value, and a license expiration date has passed, and (iv) a valid license file is not present, license error timer does not have a selected value, and the computational component is not currently in the no-license mode.

18. The medium of claim 14, wherein the set of features comprise a plurality of call processing functions selected from the group call vectoring, voice mail, restrict call forward off net, Digital Communication System or DCS internetworking, enhanced conferencing, IP trunks, maximum number of ports, holiday vectoring, and automatic call distribution.

19. The medium of claim 14, wherein the computational component enters the license-error licensing mode only when a license error timer does not have the selected value.

20. The medium of claim 14, wherein, when an event in the first set of events applies, the computational component enters the no-license licensing mode independent of the value of the license error timer.

21. The medium of claim 14, wherein the license file comprises first, second, and third types of features, the first type of feature relating to features having an on/off state, the second type of feature relating to features having a numeric value, and the third type of features having a product value, a release number, and a numeric value.

22. The medium of claim 14, wherein the license file comprises the following sets of fields: a serial number field indicating a serial number of a licensed computational component, a platform type field indicating at least one of a type, name, and version of the computational component, a release field indicating a release version of the licensed computational component, an expiration field indicating an expiration date of the license, and a feature mask, wherein the feature mask comprises identifiers of the first, second, and third types of features.

23. The medium of claim 21, wherein the first type of features comprises a plurality of the following: Digital Communication System or DCS call coverage, audible message waiting, vectoring, attendant vectoring, Asynchronous Transfer Mode or ATM Wide Area Network spare processor, ATM, dial by name, echo cancellation, multimedia call handling, multiple call handling, caller identification, multi-frequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless.

24. The medium of claim 21, wherein the second type of feature comprises a plurality of the following: logged-in automated call distribution or ACD agents, maximum currently registered IP stations, maximum administered IP trunks, offer category, maximum number of ports, maximum number of administered remote office trunks, and maximum number of mobile stations.

25. The medium of claim 14, wherein, in the no-license licensing mode, most new call originations are denied and most incoming calls are denied.

26. The medium of claim 14, further comprising:
(g) generating an alarm notification indicating entry into the license-error licensing mode.

27. The medium of claim 14, wherein, in the no-license licensing mode, the computational component permits only outgoing and incoming calls involving a predefined set of numbers.

28. A computer readable medium comprising, in the form of processor executable instructions:
(a) a license manager operable to perform the following operations:
(a1) receive a first message from a computational component requesting permission to run;
(a2) select a license response; and
(a3) selecting the license response, based on whether at least one event of a first set of events applies and at least one event of a second set of events applies;
(b) a mode setting agent operable to enable one of a no-license license mode, a license-error license mode, and a license-normal license mode for the computational component at any time, wherein, in each of the license-error and license-normal license modes, a common set of features performed by the computational component are operational and, in the no-license license mode, the common set of features is not operational, wherein the license modes are enabled according to the following rules:
(b1) in response to at least one of a first set of events applying, directly enter the no-license mode without first providing a user of the computational component with a grace period to correct the at least one of the first set of events; and (b2) in response to at least one of the second set of events applying, enter the license-error mode in which a user of the computational component has a grace period in which to correct the at least one of the second set of events.

29. The component of claim 28, wherein the license response indicates that a valid license file is present, wherein the events in the first set of events comprise a plurality of the following: at least one of a computational component name and version failing to match at least one of a name and version in the license file, an offer category of the computational component failing to match an offer category in the license file, a valid license not being present and a current license mode of the computational component being a mode other than the no-license license mode, and a license error timer having a selected value and an event in a third set of events applies.

30. The component of claim 29, wherein the events in the third set of events comprise a plurality of a serial number of the computational component fails to match a serial number in the license file, a set of feature limits has been exceeded, and a license expiration date has passed.

31. The component of claim 28, wherein, in response to no event in the first and second sets of events applying, the license-normal license mode is entered, wherein the events in the second set of events comprise a plurality of (i) a valid license file is present, a license error timer does not have a selected value, and a serial number of the computational component fails to match a serial number in the license file, (ii) a valid license file is present, a license error timer does not have a selected value, and a set of feature limits has been exceeded, (iii) a valid license file is present, a license error timer does not have a selected value, and a license expiration date has passed, and (iv) a valid license file is not present, license error timer does not have a selected value, and the computational component is not currently in the no-license license mode.

32. The component of claim 28, wherein the operations of claim 28 are performed by a computer and wherein the common set of features comprise a plurality of call processing functions selected from the group call vectoring, voice mail, restrict call forward off net, Digital Communication System or DCS internetworking, enhanced conferencing, IP trunks, maximum number of ports, holiday vectoring, and automatic call distribution.

33. The component of claim 28, wherein the computational component enters the license-error license mode only when a license error timer does not have the selected value.

34. The component of claim 28, wherein, when an event in the first set of events applies, the computational component enters the no-license license mode independent of the value of the license error timer.

35. The component of claim 28, wherein the computational component has a valid license file, wherein the license-normal license mode is selected, and wherein the license file comprises first, second, and third types of features, the first type of feature relating to features having an on/off state, the second type of feature relating to features having a numeric value, and the third type of features having a product value, a release number, and a numeric value.

36. The component of claim 28, wherein the license file comprises the following sets of fields: a serial number field indicating a serial number of a licensed computational component, a platform type field indicating at least one of a type, name, and version of the computational component, a release field indicating a release version of the licensed computational component, an expiration field indicating an expiration date of the license, and a feature mask, wherein the feature mask comprises identifiers of the first, second, and third types of features.

37. The component of claim 35, wherein the first type of features comprises a plurality of the following: Digital Communication System or DCS call coverage, audible message waiting, vectoring, attendant vectoring, Asynchronous Transfer Mode or ATM Wide Area Network spare processor, ATM, dial by name, echo cancellation, multimedia call handling, multiple call handling, caller identification, multi-frequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless.

38. The component of claim 35, wherein the second type of feature comprises a plurality of the following: logged-in automated call distribution or ACD agents, maximum currently registered IP stations, maximum administered IP trunks, offer category, maximum number of ports, maximum number of administered remote office trunks, and maximum number of mobile stations.

39. The component of claim 28, wherein the no-license license mode is selected and wherein, in the no-license license mode, the computational component permits only outgoing and incoming calls involving a predefined set of numbers.

40. A licensing system, comprising:
a processor operable to validate a license to a computational component, the processor, in response to receipt from the computational component of a first message requesting permission to run, selecting, for the computational component, a license mode from at least the following: a normal-license mode, a license-error mode, and a no-license mode; wherein:
the processor selecting the license mode as a function of at least the following factors: a current license mode of the computational component, whether a valid license file is present, whether at least one of a computational component name, offer category, and version match a corresponding at least one of a name, offer category, and version in the license file, whether a license error timer has a selected value, whether a serial number of the computational component matches a serial number in the license file, and whether a set of feature limits is exceeded;
in each of the license-error and license-normal modes, a common set of features performed by the computational component is enabled and operational and, in the no-license mode, the common set of features is not enabled and is not operational, and
in response to the processor determining that a current license mode of the computational component is the license-normal mode and that a selected factor is at least one or present and absent, the processor selects the no-license mode without first providing a user of the computational component with a grace period.

41. The system of claim 40, wherein the no-license mode is selected when at least one of a computational component name, offer category, and version fail to match a corresponding at least one of a name, offer category, and version in the license file, a license error timer has a selected value, a serial number of the computational component fails to match a serial number in the license file, and a set of feature limits is exceeded.

42. The system of claim 40, wherein the set of features comprise a plurality of call processing functions selected from the group call vectoring, voice mail, restrict call forward off net, Digital Communication System or DCS internetworking, enhanced conferencing, IP trunks, maximum number of ports, holiday vectoring, and automatic call distribution.

* * * * *